United States Patent [19]

Morscheck

[11] Patent Number: 4,989,706
[45] Date of Patent: Feb. 5, 1991

[54] SYNCHRONIZER

[75] Inventor: Timothy J. Morscheck, Kalamazoo, Mich.

[73] Assignee: Eaton Corporation, Cleveland, Ohio

[21] Appl. No.: 427,070

[22] Filed: Oct. 25, 1989

[51] Int. Cl.[5] ............................................. F16D 23/02
[52] U.S. Cl. .................................... 192/53 E; 74/339
[58] Field of Search .............. 192/53 E, 53 F; 74/339

[56] References Cited

U.S. PATENT DOCUMENTS

| | | | |
|---|---|---|---|
| 2,667,955 | 2/1954 | Bixby | 192/53 E |
| 3,078,975 | 2/1963 | Eaton | 192/53 E |
| 3,175,413 | 3/1965 | Peras | 74/339 |
| 3,548,983 | 12/1970 | Hiraiwa | 192/53 F |
| 3,861,509 | 1/1975 | Inoue et al. | 192/53 F |
| 4,018,319 | 4/1977 | Thomas | 192/53 E |
| 4,059,178 | 11/1977 | Magg et al. | 192/53 F |
| 4,125,179 | 11/1978 | Cochran et al. | 192/53 E |
| 4,252,222 | 2/1981 | Morscheck | 74/339 |
| 4,428,469 | 1/1984 | Morscheck | 192/53 E |
| 4,540,074 | 9/1985 | Magg et al. | 192/53 F |
| 4,727,968 | 3/1988 | Chana | 192/53 F |
| 4,796,741 | 1/1989 | Loeffler | 192/53 E |
| 4,817,773 | 4/1989 | Knödel et al. | 74/339 |
| 4,905,806 | 3/1990 | Hillenbrand et al. | 192/108 |
| 3,9106,390 | 10/1975 | Eichinger | 192/53 F |

FOREIGN PATENT DOCUMENTS 466965  8/1950  Canada .................................. 74/339

Primary Examiner—Rodney H. Bonck
Assistant Examiner—Nicholas Whitelaw
Attorney, Agent, or Firm—H. D. Gordon

[57] ABSTRACT

A pin-type synchronizer assembly (58) having blocker pins (74) with secondary ramps (80) effective after synchronizing is achieved to minimize "notchiness" is provided.

12 Claims, 4 Drawing Sheets ated by the 4,989,706

SYNCHRONIZER

BACKGROUND OF THE INVENTION

1. Field of the Invention

This invention relates to a synchronizer assembly for vehicular transmissions and, in particular, to an improved pin type synchronizer assembly utilizing an improved blocker pin, and preferably an improved jaw clutch tooth, structure.

2. Description of the Prior Art

Synchronized jaw clutch assemblies for use in change gear transmissions, usually vehicular change gear transmissions, are well known in the prior art and examples thereof may be seen by reference to U.S. Pat. Nos. 3,078,975; 3,548,983; 4,059,178; 4,252,222 and 4,540,074, the disclosures of all of which are hereby incorporated by reference. Pin type synchronizers, also known as "Clark type" synchronizers, are also well known to the prior art as may be seen by reference to U.S. Pat. Nos. 2,667,955; 3,910,390; and 4,018,319, the disclosures of all of which are hereby incorporated by reference.

Pin type synchronizer assemblies generally include an axially slideable clutch collar member that is mounted on a splined portion of a shaft on which a pair of axially spaced gears are rotatably mounted. The clutch collar member is provided with jaw clutch teeth which are adapted to be disposed in engagement with complimentary jaw clutch teeth formed on the rotatable gears for positively clutching a selected one of the gears to the shaft. The clutch collar member is formed with a radially extending flange having a plurality of circumferentially spaced openings therethrough and parallel to the shaft. Disposed through certain ones of these openings are pins which are fixed at their ends with synchronizer rings that are adapted to cooperate with the aforesaid gears. The pins, usually called blocker pins, have reduced central portions that define radially outwardly extending shoulders that are adapted to cooperate with the flange opening edges for blocking relative axial movement of the latter with respect to the synchronizer rings when they are rotating nonsynchronously. Disposed within others of said flange openings are a plurality of longitudinally split spring pin assemblies which are freely received at their ends in recesses formed in the synchronizer rings. The split pin spring assemblies are formed with centrally located annular grooves which are biased into engagement with the peripheries in the openings of the clutch collar member flange by resilient means. As is well known, upon initial axial movement of a clutch collar member, the synchronizer rings are caused to move cojointly therethrough by the pin assemblies.

While change gear transmissions utilizing synchronized jaw clutch assemblies, including split pin type of synchronizer assemblies, are widely used and very commercially successful, especially in connection with relatively heavy duty vehicles, such transmissions are not totally satisfactory as the amount of force the operator is required to apply to the shift lever will abruptly decrease and then abruptly increase as the synchronizing event concludes and the jaw clutch member moves unopposed from its previously blocked position to an axial position whereat the jaw clutch teeth to be engaged come into axial abutment and then into axial engagement. This abrupt change in force required at the shift lever, known as "notchiness", provides a feel to the operator which is at least somewhat objectionable.

SUMMARY OF THE INVENTION

In accordance with the present invention, the drawbacks of the prior art have been overcome to the extent that a manual change gear vehicular transmission utilizing an improved pin type synchronizing assembly is provided which minimizes or eliminates "notchiness" and provides a more pleasing and satisfactory feel to the vehicle operator.

The above is accomplished by providing an improved pin type synchronizer assembly utilizing an improved blocker pin having the first ramp portion, corresponding to the ramp portions utilized in prior art devices, which will cooperate with the opening in the clutch collar flange to block axial movement of the jaw clutch teeth relative to the synchronizer ring until substantial synchronous rotation is achieved between the clutch collar and the gear to be engaged. A second ramp portion, located axially outwardly from the first ramp portion, is provided on the blocker pin which will interact with the opening in the jaw clutch collar flange as the jaw clutch collar is moved axially from its blocked position towards the position where the engaging clutch teeth come into axial abutting position. This second ramp portion is provided with a relatively shallow angle sufficient to provide a significant mechanical advantage in such axial movement and thereby prevent an abrupt drop off and then increase in the resistance to movement of the manual shift lever as the clutch collar is moved from the blocked towards the tooth abutment position.

Preferably, the backlash, or clearance, between the clutch collars and blocking pins is increased to equal about one-half of a clutch tooth width, and the clutch teeth leading edge ramps used to overcome drag are provided with relatively sharp angles, to reduce the axial force needed to move from synchronization to full jaw clutch engagement.

This and other objects and advantages of the present invention will become apparent upon reading of the detailed description of the present invention taken in connection with the attached drawings.

DESCRIPTION OF THE PREFERRED EMBODIMENT

Figure 1:
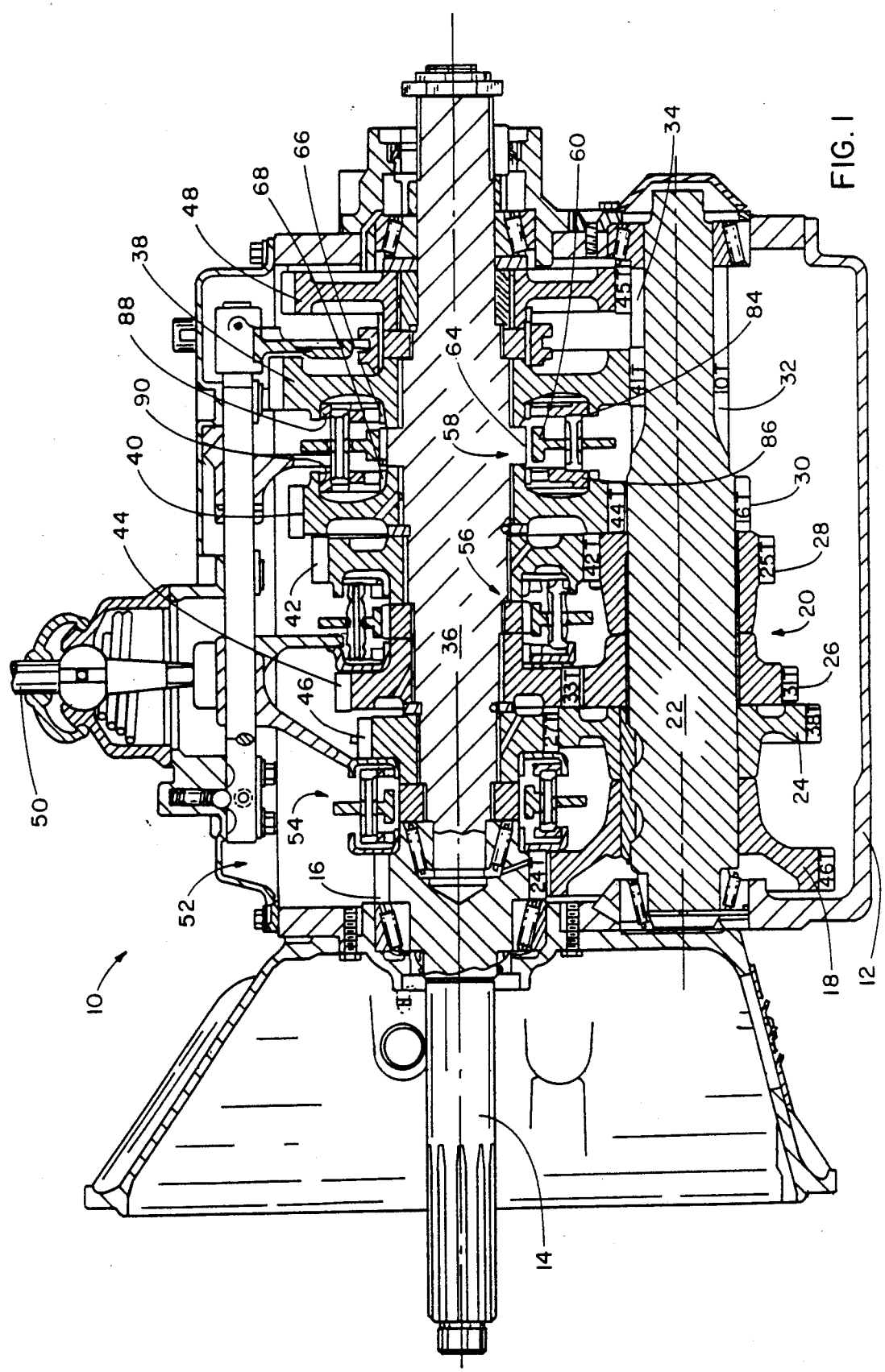
FIG. 1 is an elevational view, in section, of a typical vehicular change, gear transmission utilizing the improved synchronizer assemblies of the present invention.

In the following description of the preferred embodiment, certain terms will be used for convenience in reference only and are not intended to be limiting. The terms "upwardly", "downwardly", "rightwardly" and "leftwardly" will designate directions in the drawings to which reference is made. The terms "forward", and "rearward", will refer respectively to the front and rear ends of the transmission as conventionally mounted in the vehicle, being respectfully to the left and right sides of the transmission as illustrated in FIG. 1. The words "inwardly" and "outwardly" will refer to directions towards and away from, respectfully, the geometric center of the device and designated parts thereof. The above applies to the words above specifically mentioned, derivatives thereof and words of similar import.

Referring to FIG. 1, there is illustrated a six forward speed, single reverse speed manually shifted change gear transmission of well known design. Transmission 10 is housed within a housing 12 and includes an input shaft 14 driven by a prime mover, such as a well known diesel engine (not shown) through a normally engaged, selectively disengaged, master friction clutch (not shown).

Input shaft 14 carries input gear 16 which is constantly meshed with a countershaft gear 18 for driving countershaft assembly 20. Countershaft assembly 20 includes a countershaft 22 and countershaft gears 18, 24, 26, 28, 30, 32, and 34 fixed for rotation therewith.

A main shaft or output shaft 36 is rotatably supported in the housing 12 and has a plurality of ratio gears rotatably supported thereby and selectively clutchable one at a time thereto as is known in the prior art. First speed ratio gear 38 is constantly meshed with countershaft gear 32, second speed ratio gear 40 is constantly meshed with countershaft gear 30, third speed to ratio gear 42 is constantly meshed with countershaft gear 28, fourth speed ratio, gear 44 is constantly meshed with countershaft gear 26, and fifth speed ratio gear 46 is constantly meshed with countershaft gear 24. Sixth or high speed is obtained by clutching the output shaft 36 directly to the input gear 16 for a direct drive connection while reverse operation is obtained by clutching the reverse ratio gear 48 to the output shaft 36, which reverse ratio gear 48 is constantly meshed with countershaft gear 34 by means of an idler gear (not shown).

A manually operated shift lever 50 operates a shift bar housing assembly 52 for purposes of engaging and disengaging the synchronized jaw clutch assemblies 54, 56, and 58. Briefly, synchronized jaw clutch assembly 58 may be utilized to engage either gear 38 or 40 to the output shaft 36, synchronized jaw clutch assembly 56 may be utilized to engage either gear 42 or 44 to the output shaft 36 while synchronized jaw clutch assembly 54 may be utilized to engage either ratio gear 46 or input gear 16 to the output shaft 36.

The structure, function and operation of synchronized jaw clutch assemblies 54, 56 and 58 is well known in the prior art and thus will only be briefly described for one of the clutch assemblies, 58, for illustrative purposes.

For selectively connecting either ratio gear 38 or ratio gear 40 to the main shaft or output shaft 36, synchronizer and clutch assembly mechanism 58 is deposed concentrically about shaft 36 intermediate of rotatable gears 38 and 40. Synchronized jaw clutch assembly 58 includes an intermediate clutch collar member or coupling sleeve 60 which is connected by internal splines 62 to the shaft 36 which carries external splines 64. The internal splines 62 of the clutch collar 60 also defined clutch teeth which are selectively engageable with clutch teeth 66 and 68, respectively, carried by the gears 38 and 40, respectively, on axially inwardly extending hub portions thereof.

Figure 2:
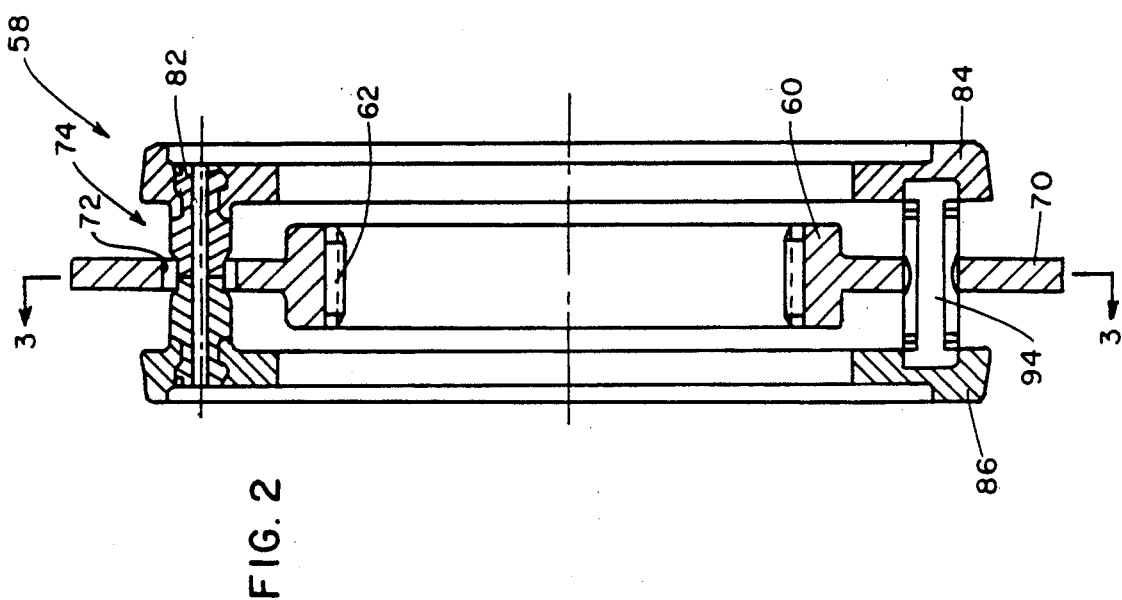
FIG. 2 is an enlarged sectional view of the improved synchronizer assembly of the present invention.
Figure 3:
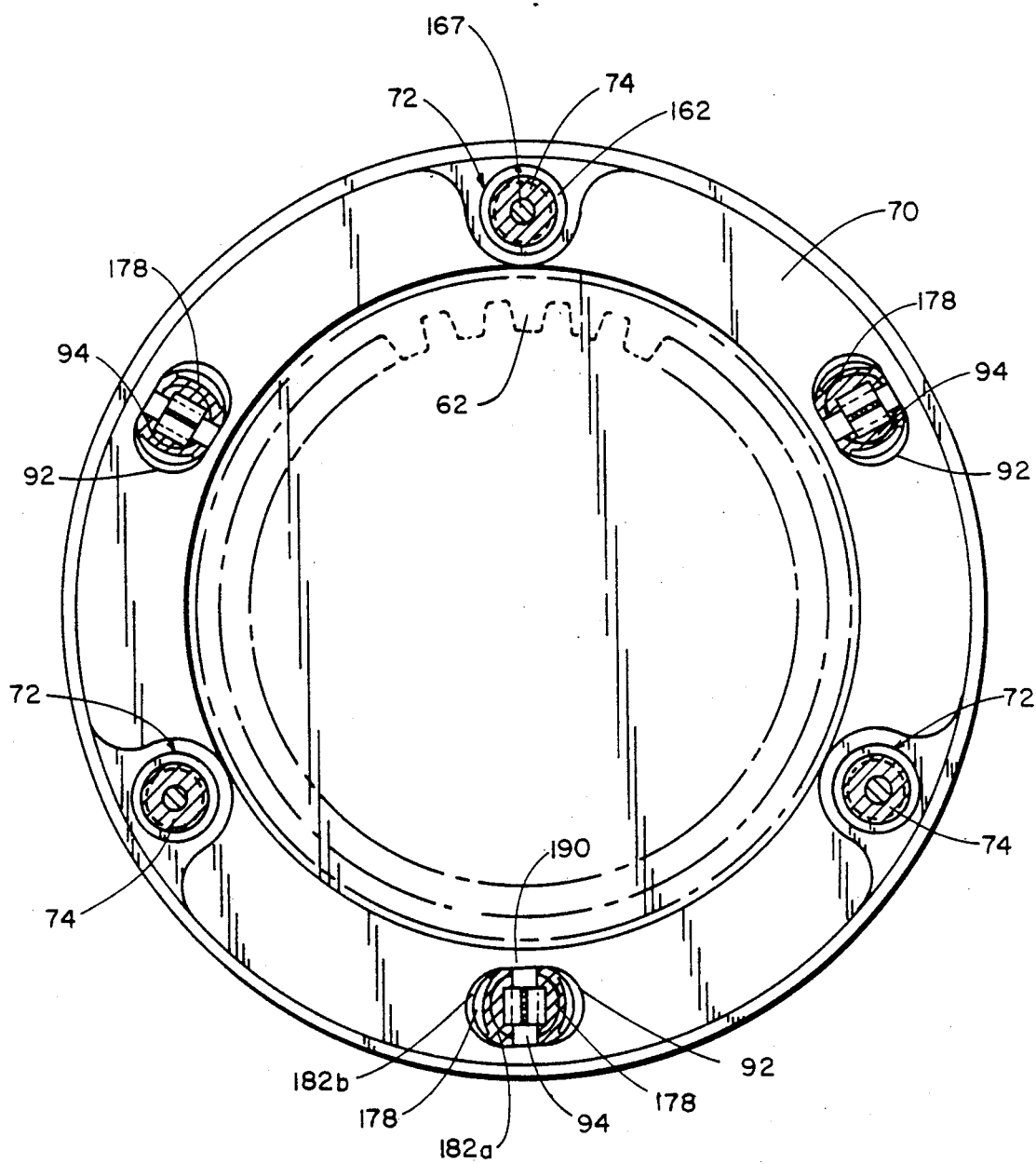
FIG. 3 is a sectional view taken along line 3—3 of FIG. 2.

Referring to FIGS. 1, 2, and 3, it may be seen that collar 60 is provided with a radially outwardly projecting annular flange portion 70 which has a plurality of circular aperatures or openings 72, the edges of which are beveled or countersunk. Disposed through openings or aperatures 70 are solid or blocker pins 74, each of which has a central annular groove 76 and opposed radially and axially outwardly extending first ramp portions 78 and second ramp portions 80. The angle of inclination of ramp portions 78 are relatively steep, and may be in the range of 20-40% relative to vertical. Conversely, as may be seen in reference to above-mentioned U.S. Pat. No. 4,018,319 first ramp portion 78 may define dual angle ramps of about 25° and about 45° relative to vertical.

The blocker pins 76, at reduced end portions 82, are rigidly secured such as by riveting within openings formed in a pair of axially spaced synchronizer rings or friction clutch members 84 and 86. Each of the synchronizer ring members has a conical or tapered outer surface which is adapted to coact with clutch cone members 88 and 90, respectively, to form a friction cone clutch. Clutch cone members 88 and 90 are secured to gears 38 and 40, respectively.

Disposed through generally oblong recesses 92 provided in the flange portion 70 are split pin spring assemblies 94 of known construction and function.

The axial shifting of clutch collar 70 is accomplished by means of shift forks which form a portion of the shift bar housing assembly 52 as is well known in the prior art. With the synchronized jaw clutch assembly 58 in the centered position as illustrated in FIG. 1, axial movement to the clutch collar to the right will engage the first speed ratio gear 38 to the output shaft 36 while axial movement of the clutch collar 70 to the left will engage the second speed ratio gear 40 to the output shaft 36.

Engagement of either ratio gear 38 or ratio gear 40 to shift 36 by the synchronized jaw clutch assembly 58 may be considered as occurring in four sequentially related phases. During the first phase, the jaw clutch collar 70 is moved into engagement with the ramp portion 78 of the blocker pin 74 and one of the cone clutches defined by surfaces 84 and 88 or 86 and 90 is brought into incipient engagement. During this phase, the spring pin assembly 94 will assure that the synchronizer ring and blocker pin assembly is properly clocked relative to the clutch collar to assure that the edges of the aperatures 72 will engage the first ramped portions 78 of the blocker pins. During the second phase of engagement, the axial force on the clutch collar is transmitted by the countersunk edges of aperatures 72 to the ramped portion 78 of a blocker pins 74 to apply an axial force to engage the involved cone clutch sufficiently to force a synchronous rotation of the jaw clutch members to be engaged. This requires a relatively high axial force which may be supplied by the operator exerting a relatively high force on the shift lever, which force is typically about eighty pounds (80 lbs.) in a medium duty truck transmission. During the third phase of engagement, as is well known, the second phase also includes an additional axial movement as the blocker pins 74 and apertures 72 are moved circumferentially back to the unclocked, coaxial position, which occurs after synchronous conditions exist, the clutch collar 60 moves freely beyond the first ramped portion 78 of the blocker pin until the clutch teeth 62 come into axial abutting engagement with the external clutch teeth of the ratio gear to be engaged. During the fourth and final phase of engagement, an axial force is applied to the abutting jaw clutch teeth, the leading axial edges are provided with appropriate ramped or rounded surfaces, to cause the jaw clutch members to clock relative to one another into a circumferentially aligned position allowing axial engagement of the clutch teeth. This requires a relatively high axial force which may be provided in a typical medium duty transmission by the operator exerting approximately a seventy (70 lbs.) force on the shift lever.

Figure 4:
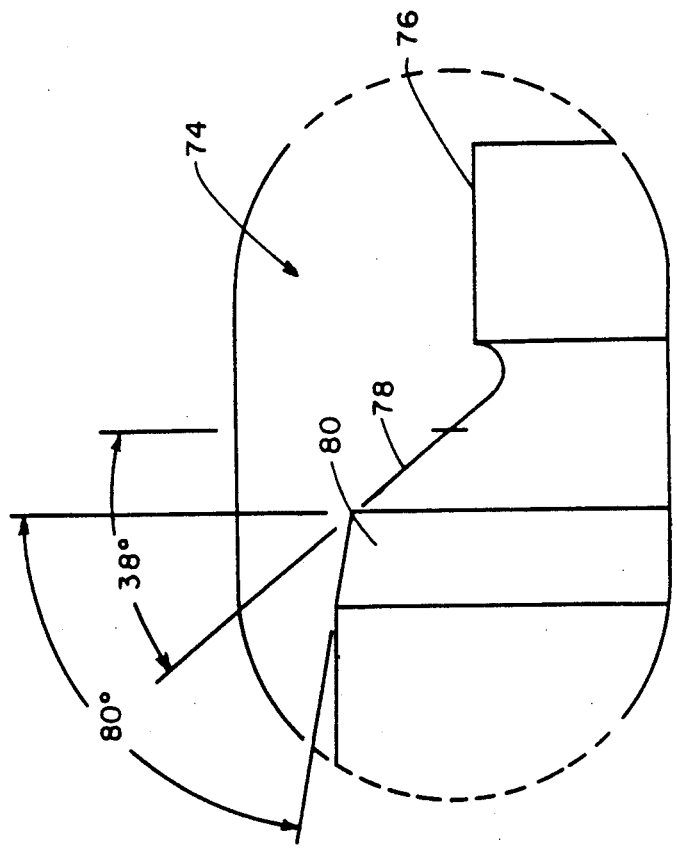
FIG. 4 is an enlarged partial elevational view of the ramped portions of the improved blocker pins of the improved synchronizer assembly of the present invention.
Figure 5:
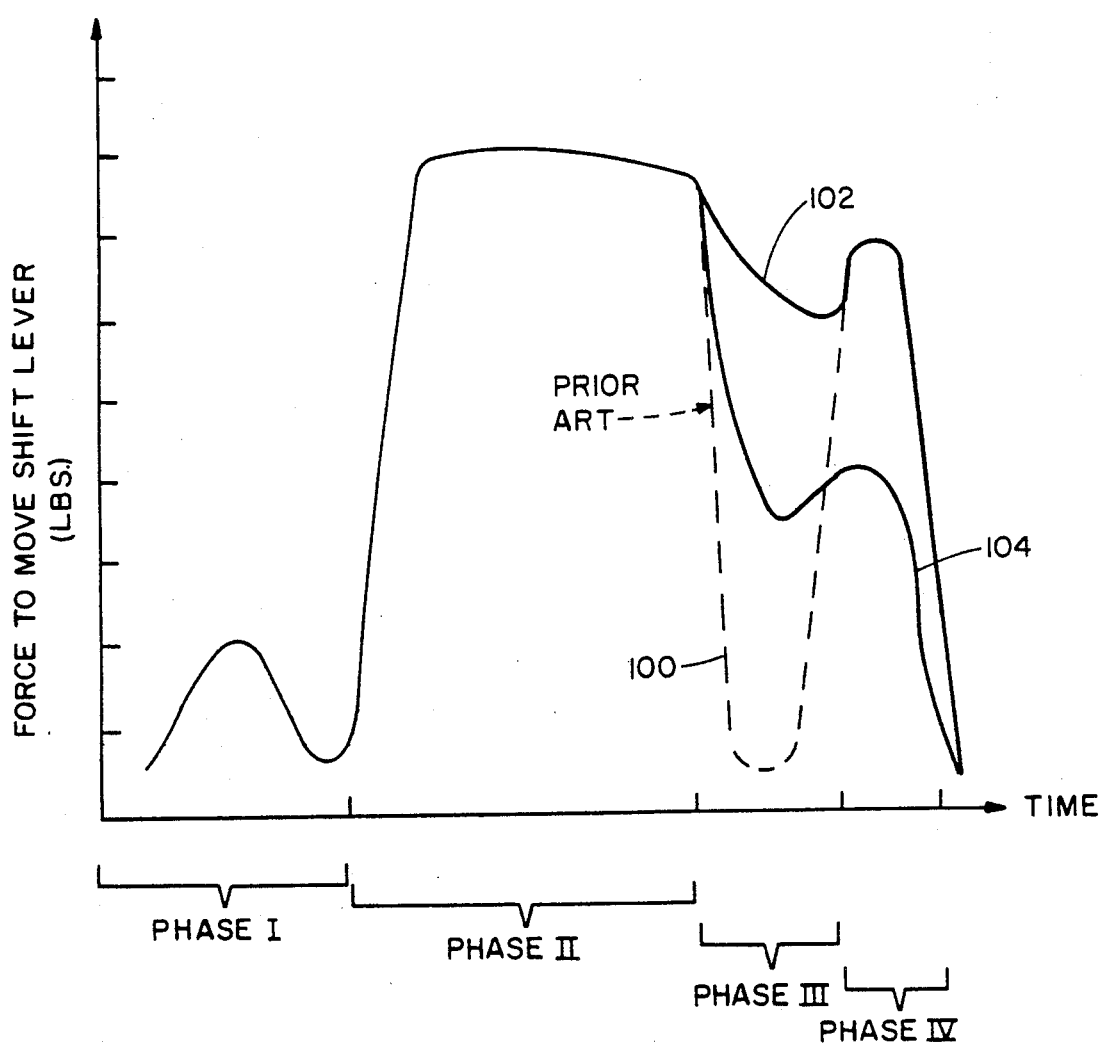
FIG. 5 is a graphical illustration of the forces required to move the shift lever of the transmission of FIG. 1 during the various phases of engaging a selected gear ratio.

Referring to the graphical representation of FIG. 5, forces required to move the shift lever during the various phases of synchronized jaw clutch engagement are illustrated. The dotted line (line 100) representation of the phase 3 portion of FIG. 5 represents the forces required with the prior art type synchronized jaw clutch assemblies while the solid line portion represents the forces required with the synchronized jaw clutch assemblies of the present invention. It is noted that the force required at the shift lever for both the prior art synchronized jaw clutch assembly, and one embodiment (line 102) of the synchronized jaw clutch assembly of the present invention, are substantially identical during phases I, II and IV of the jaw clutch engagement sequence. In the prior art synchronizer assemblies, the outer surfaces of the blocker pins located axially outwardly of the first ramped portions 78 were flat and untapered and thus movement of the jaw clutch collars during the third phase of engagement axially outwardly from the first ramp portion until the jaw clutch teeth came into abutting engagement required little or no axial force as may be seen by the dotted line 100 in FIG. 5. However, upon the jaw clutch teeth coming into abutting engagement, a significant axial force was required to cause the jaw clutch teeth to become properly circumferentially aligned for axial engagement thereof. This abrupt drop and then increase in the forces required in the shift lever provided a relatively undesirable condition known as "notchiness". To overcome this problem, applicant has discovered that by providing a second ramped surface 80, as may be seen by reference to FIG. 4, which surface is of a relatively shallow angle, such as 70°-85° relative to vertical, movement of the clutch collar during a third phase of engagement will require a significant axial force of about fifty-five pounds (55 lbs.) in a medium duty transmission which will significantly minimize or eliminate the feeling of notchiness as may be seen by reference to FIG. 5.

Accordingly, it may be seen that, by providing a second ramped portion 80, which is located axially outwardly from the first ramped portion 78 of the blocker pin and which will cooperate with the clutch collar as the clutch collar is moved towards the axial position at which jaw clutch teeth abutment will engage from the axial position at which synchronization was achieved, which second ramped portion is provided with a relatively shallow ramp angle, a relatively simple and inexpensive modification is provided which minimizes or eliminates the undesirable notchiness of transmission utilizing the prior art pin type synchronized jaw clutch assemblies.

Figure 6:
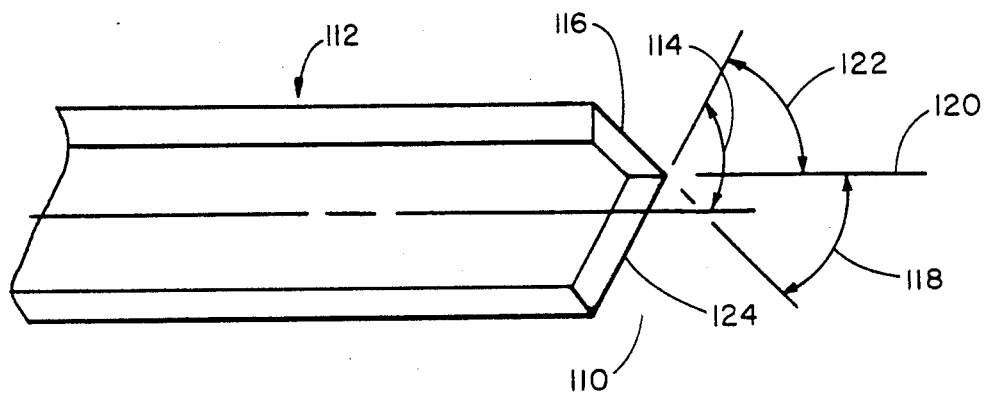
FIG. 6 is an enlarged partial view of the preferred clutch tooth leading edge structure of the present invention.

To further increase the shift quality of the synchronized jaw clutches of the present invention, the jaw clutch teeth may be modified as shown in FIG. 6 and/or the clearance between aperatures 72 and the synchronizer blocker pins 74 may be increased.

Referring to FIG. 6, the leading edge 110 of jaw clutch tooth 112 defines an included angle 114 which should not be less than a predetermined minimal value, about 110° to 120°, to prevent the tip from becoming too sharp and brittle. Also, the ramp surface 116 engaged during downshifts when the drag on the transmission shaft and gearing must be overcome to circumferentially shift the abutting teeth into proper circumferential alignment for engagement should have a relatively sharp angle 30°-50° to reduce the axial forces necessary on the abutting tooth edge ramps to cause a desired circumferential alignment.

To achieve this result, the clutch leading edge is assymetrical with the ramp engaged during downshifts 116 defining an angle 118 relative to the axis 120 which is considerably smaller than the angle 122 defined by the other ramp surface 124. By way of example, angle 118 may equal about 40°, angle 122 may equal 65° and included angle 114 will equal about 115°.

Referring to FIG. 5, line 104 represents the improved axial forces required during phases III and IV when using the improved clutch teeth structure of FIG. 6 in combination with the improved blocker pin ramp structure illustrated in FIG. 4.

From the foregoing, it is believed that those familiar with the art will recognize and appreciate the novel concepts and features of the improved synchronizer assembly of the present invention. While the present invention has been described in relation to only a single preferred embodiment, numerous variations, changes and substitutions of equivalents will present themselves to persons skilled in the art and may be made without departing from the scope and spirit of the present invention.

I claim:

1. A synchronizer assembly for selectively coupling a gear rotatably mounted about the axis of a shaft with said shaft, said gear having jaw clutch teeth and friction clutch elements at a side thereof facing said clutch and synchronizer assembly, said clutch and synchronizer assembly including a clutch collar member axially slidable on the shaft and mounted for rotation therewith, said clutch collar member having a first set of jaw clutch teeth adapted to cooperate with a second set of jaw clutch teeth on the gear, said clutch collar member having openings formed therethrough parallel to the shaft, an axially movable friction clutch member adapted to cooperate with the friction clutch element on the gear, blocking means rigidly mounted to said axially moveable friction clutch member, said blocking means having a nonblocking position for allowing axial movement of said clutch collar relative to said axially movable friction clutch member and a blocking position, said blocking means in the blocking position being adapted to block axial movement of said clutch collar member relative to said axial moveable friction clutch member when the latter and said clutch collar member are rotating asynchronously, said synchronizer assembly characterized by:

anti-notchiness means (80) for cooperating with said clutch collar, subsequent to achieving synchronous rotation between said clutch collar and said gear and said blocking means obtaining the nonblocking position thereof, during axial movement of said clutch collar toward a position whereat said first and second sets of jaw clutch teeth will come into axially abutting relationship.

2. The assembly of claim 1 wherein said blocking means includes a rigid blocking pin including an axially aligned groove portion and, a first ramped portion extending radially and axially outwardly from said grooved for cooperation with said openings formed in said clutch collar, said anti-notchiness means comprising a second ramped portion extending radially and axially outwardly from said first ramped portion, said second ramped portion defining a smaller angle relative to said axis than said first ramped portion.

3. The assembly of claim 2 wherein at least one set of said jaw clutch teeth define a leading edge (110) defined by a first ramp surface (116) engaged during downshifts and a second ramp surface (124) engaged during upshifts, an angle (118) defined by said first ramp surface and an axially extending line (120) being less than fifty percent of an included angle (114) defined by said ramp surfaces.

4. The assembly of claim 3 wherein said included angle is equal to about 110° and said angle defined by said first ramp surface is equal to about 40°.

5. A synchronized jaw clutch assembly for engaging a gear to a shaft about which it is rotatably mounted, said assembly including a jaw clutch member relatively axially moveable towards the complimentary jaw clutch member fixed to said gear, synchronizer means including blocker means for preventing axial movement of said jaw clutch member towards said gear member during asynchronous rotation therebetween, said assembly characterized by;
    anti-notchiness means for providing a significant mechanical advantage in axial movement of said jaw clutch member towards the clutch teeth carried by said gear during substantially all of a time period beginning subsequent to achieving synchronous rotation between said jaw clutch members and ending upon initial tooth abutment of said jaw clutch members.

6. The assembly of claim 5 wherein said blocking means includes a rigid blocking pin including an axially aligned groove portion and, a first ramped portion extending radially and axially outwardly from said grooved for cooperation with said openings formed in said clutch collar, said anti-notchiness means comprising a second ramped portion extending radially and axially outwardly from said first ramped portion, said second ramped portion defining a smaller angle relative to said axis than said first ramped portion.

7. The assembly of claim 5 wherein at least one set of said jaw clutch teeth define a leading edge (110) defined by a first ramp surface (116) engaged during downshifts and a second ramp surface (124) engaged during upshifts, an angle (118) defined by said first ramp surface and an axially extending line (120) being less than fifty percent of an included angle (114) defined by said ramp surfaces.

8. The assembly of claim 7 wherein said included angle is equal to about 110° and said angle defined by said first ramp surface is equal to about 40°.

9. A synchronized transmission including at least one synchronizer assembly for selectively coupling a gear rotatably mounted about the axis of a shaft with said shaft, said gear having jaw clutch teeth and friction clutch elements at a side thereof facing said clutch and synchronizer assembly, said clutch and synchronizer assembly including a clutch collar member axially slidable on the shaft and mounted for rotation therewith, said clutch collar member having a first set of jaw clutch teeth adapted to cooperate with a second set of jaw clutch teeth on the gear, said clutch collar member having openings formed therethrough parallel to the shaft, an axially movable friction clutch member adapted to cooperate with the friction clutch element on the gear, blocking means rigidly mounted to said axially moveable friction clutch member, said blocking means having a nonblocking position for allowing axial movement of said clutch collar relative to said axially movable friction clutch member and a blocking position, said blocking means in the blocking position being adapted to block axial movement of said clutch collar member relative to said axial moveable friction clutch member when the latter and said clutch collar member are rotating asynchronously, said synchronizer assembly characterized by:
    anti-notchiness means (80) for cooperating with said clutch collar, subsequent to achieving synchronous rotation between said clutch collar and said gear and said blocking means obtaining the nonblocking position thereof, during axial movement of said clutch collar toward a position whereat said first and second sets of jaw clutch teeth will come into axially abutting relationship.

10. The transmission of claim 9 wherein said blocking means includes a rigid blocking pin including an axially aligned groove portion and, a first ramped portion extending radially and axially outwardly from said grooved for cooperation with said openings formed in said clutch collar, said anti-notchiness means comprising a second ramped portion extending radially and axially outwardly from said first ramped portion, said second ramped portion defining a smaller angle relative to said axis than said first ramped portion.

11. The assembly of claim 10 wherein at least one set of said jaw clutch teeth define a leading edge (110) defined by a first ramp surface (116) engaged during downshifts and a second ramp surface (124) engaged during upshifts, an angle (118) defined by said first ramp surface and an axially extending line (120) being less than fifty percent of an included angle (114) defined by said ramp surfaces.

12. The assembly of claim 11 wherein said included angle is equal to about 110° and said angle defined by said first ramp surface is equal to about 40°.

* * * * *

UNITED STATES PATENT AND TRADEMARK OFFICE
CERTIFICATE OF CORRECTION

PATENT NO. : 4,989,706

DATED : February 5, 1991

INVENTOR(S) : Timothy J. Morscheck

It is certified that error appears in the above-identified patent and that said Letters Patent is hereby corrected as shown below:

On the title page, item [54] and in column 1, line 2:

Correct title of the invention from "SYNCHRONIZER" to "SYNCHRONIZER ASSEMBLY".

Signed and Sealed this

Twenty-third Day of July, 1991

Attest:

HARRY F. MANBECK, JR.

*Attesting Officer*  *Commissioner of Patents and Trademarks*